United States Patent
Pirmann

(10) Patent No.: US 8,695,802 B2
(45) Date of Patent: Apr. 15, 2014

(54) RECEPTACLE FOR RECEIVING A PHOSPHOR STORAGE PLATE AND X-RAY CASSETTE

(75) Inventor: Anton Pirmann, Munich (DE)

(73) Assignee: Agfa HealthCare NV, Mortsel (BE)

( * ) Notice: Subject to any disclaimer, the term of this patent is extended or adjusted under 35 U.S.C. 154(b) by 392 days.

(21) Appl. No.: 13/124,993

(22) PCT Filed: Oct. 13, 2009

(86) PCT No.: PCT/EP2009/063337
§ 371 (c)(1), (2), (4) Date: Apr. 19, 2011

(87) PCT Pub. No.: WO2010/046277
PCT Pub. Date: Apr. 29, 2010

(65) Prior Publication Data
US 2011/0198254 A1    Aug. 18, 2011

(30) Foreign Application Priority Data
Oct. 21, 2008  (EP) ................................. 08167133

(51) Int. Cl.
*B65D 85/30*    (2006.01)

(52) U.S. Cl.
USPC ..................................................... 206/455

(58) Field of Classification Search
USPC .............. 206/455, 454, 710, 832; 396/519
See application file for complete search history.

(56) References Cited

U.S. PATENT DOCUMENTS

| 3,286,092 A |   | 11/1966 | Sames |
| 4,742,216 A |   | 5/1988 | Morse et al. |
| 4,860,042 A | * | 8/1989 | Tajima et al. ................ 396/519 |
| 4,909,389 A | * | 3/1990 | Plessers et al. .............. 206/451 |

(Continued)

FOREIGN PATENT DOCUMENTS

| EP | 1791022 A1 | 5/2007 |
| EP | 1895364 A1 | 3/2008 |

(Continued)

OTHER PUBLICATIONS

International Search Report completed on Feb. 24, 2009, from priority application No. EP08167133.1, filed on Oct. 21, 2008.

(Continued)

*Primary Examiner* — Steven A. Reynolds
*Assistant Examiner* — King M Chu
(74) *Attorney, Agent, or Firm* — Keating & Bennett, LLP

(57) ABSTRACT

The invention relates to a receptacle (28, 88, 122) for receiving a phosphor storage plate (20) comprising a phosphor storage layer (22) for storing X-ray information. Said receptacle (28, 88, 122) comprises a cover plate (98) with a first recess (102) and a base plate (100) which is at a distance from the cover plate (98) such that a receiving chamber (90, 92, 94, 96, 124) for receiving the phosphor storage plate (20) is arranged between the base plate (100) and the cover plate (98). Said phosphor storage plate (20) is maintained in the receiving chamber (90, 92, 94, 96, 124) between the cover plate (98) and the base plate (100). The first recess (102) of the cover plate (98) is above the surface of the phosphor storage layer (22) of the received phosphor storage plate (20) when the phosphor storage plate (20) is received. The invention also relates to an X-ray cassette (12, 42, 50, 78, 82) provided with said type of receiving device (28, 88, 122).

16 Claims, 10 Drawing Sheets

(56) References Cited

U.S. PATENT DOCUMENTS

Figure 1:
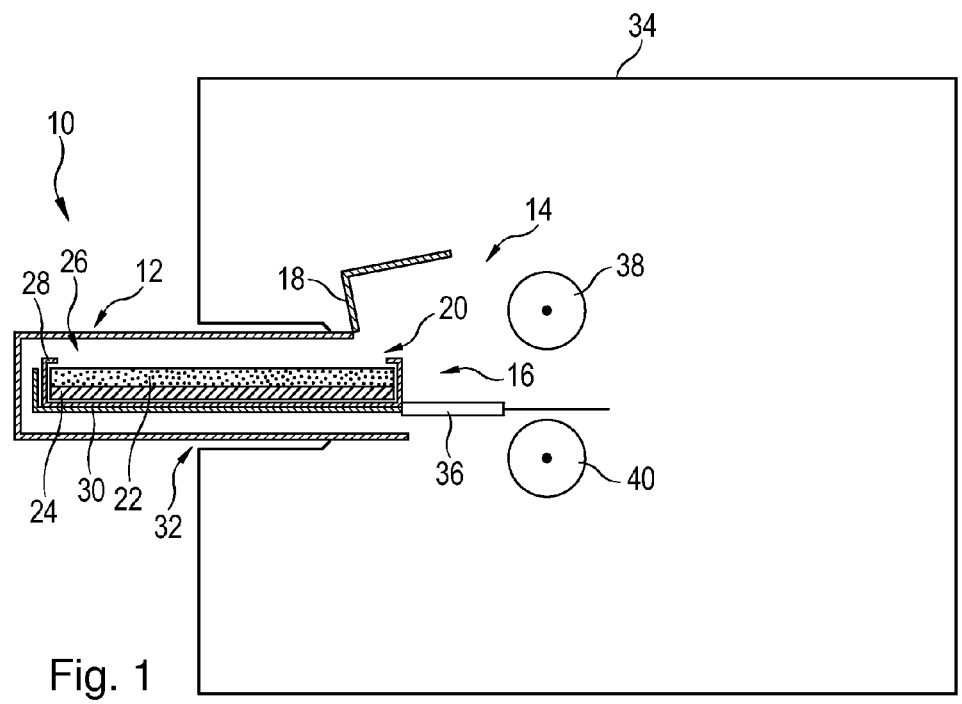

| | | |
|---|---|---|
| 7,432,512 B2 | 10/2008 | Pirmann et al. |
| 7,498,599 B2 | 3/2009 | Pirmann et al. |
| 2005/0169433 A1 | 8/2005 | Kay |

FOREIGN PATENT DOCUMENTS

| | | |
|---|---|---|
| JP | 2000039683 A | 2/2000 |
| JP | 2002182322 A | 6/2002 |
| JP | 2006106186 A | 4/2006 |

OTHER PUBLICATIONS

International Preliminary Report on Patentability dated Apr. 26, 2011, from priority application No. PCT/EP2009/063337, filed on Oct. 13, 2009.

* cited by examiner

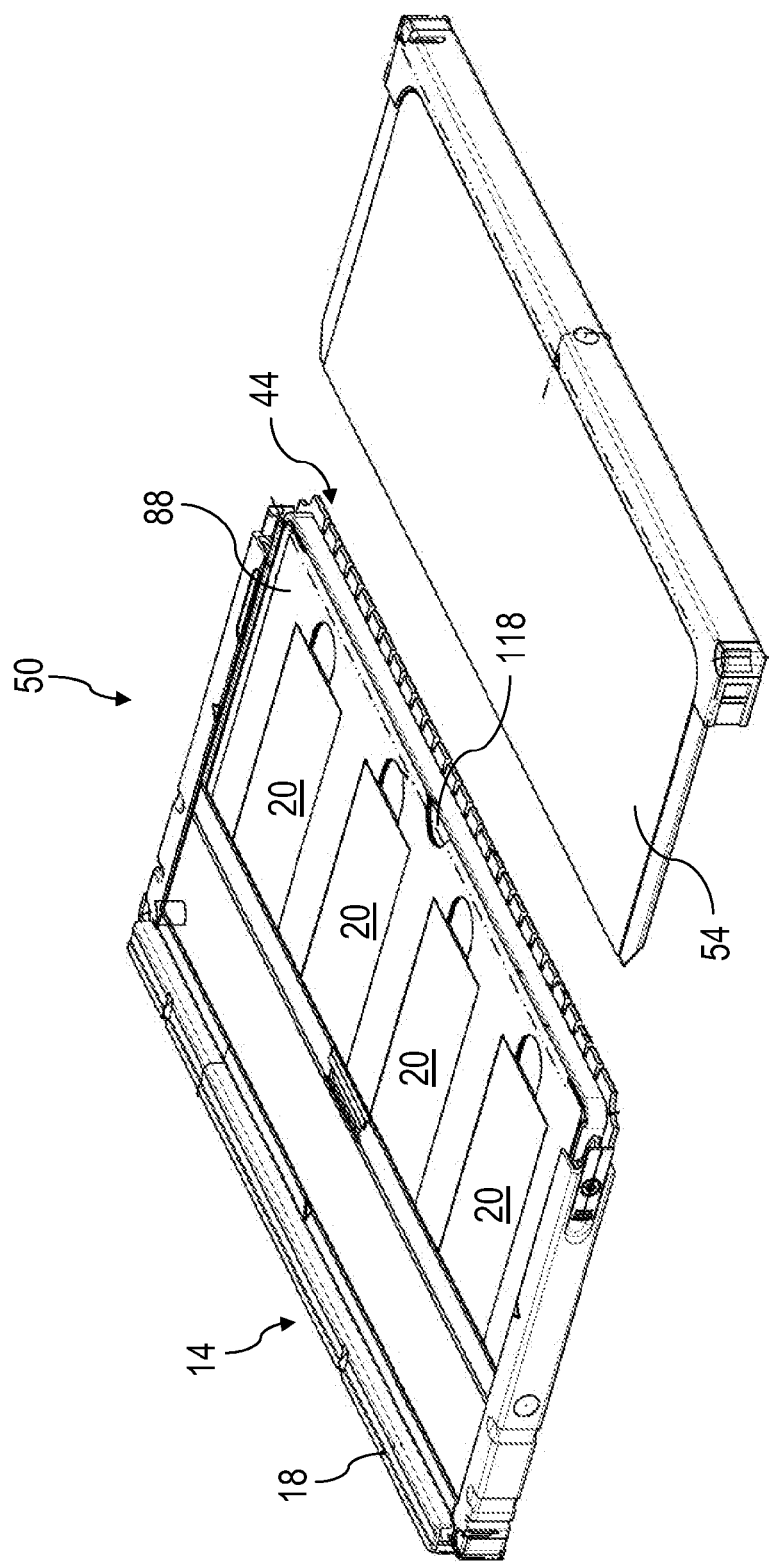

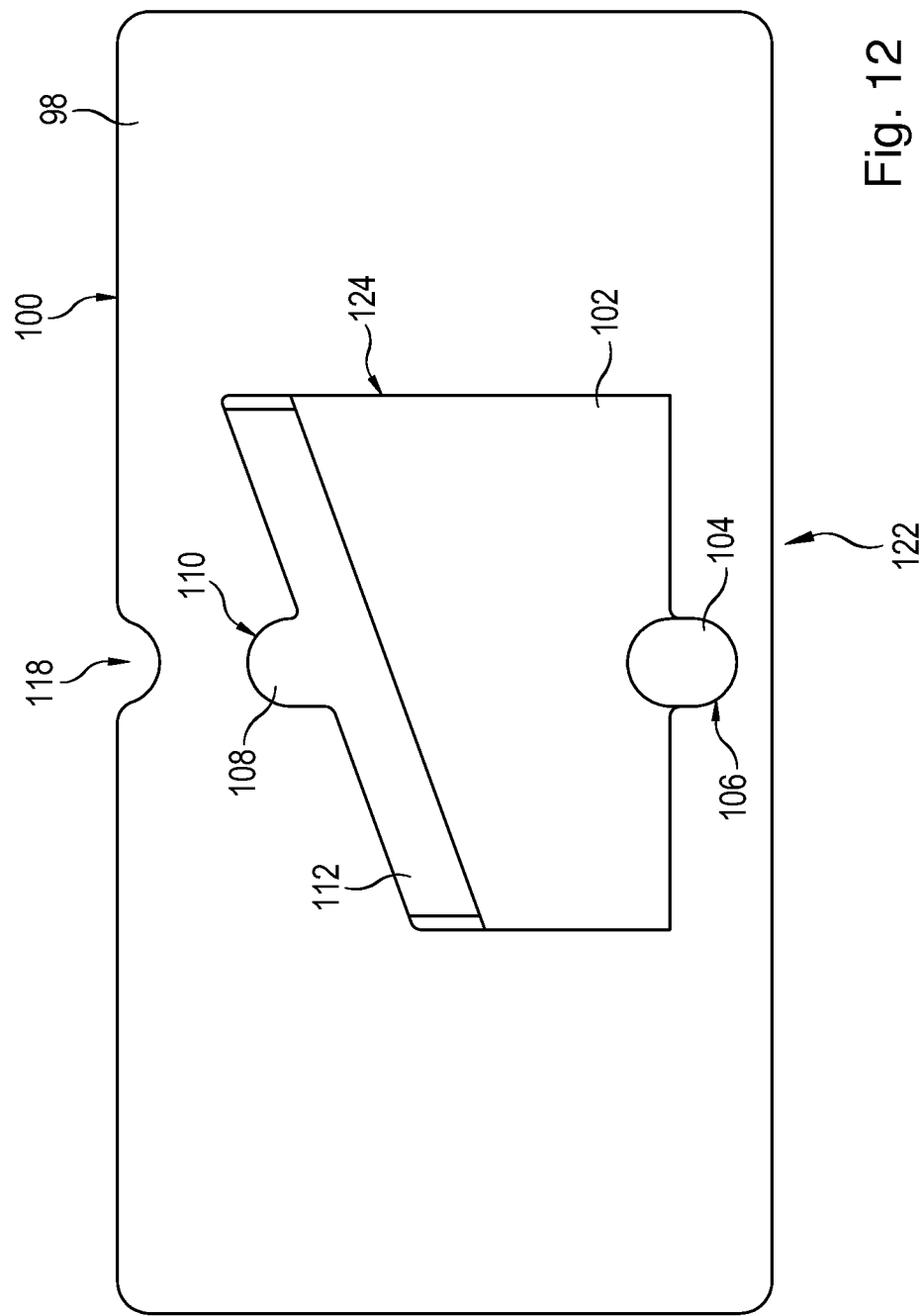

RECEPTACLE FOR RECEIVING A PHOSPHOR STORAGE PLATE AND X-RAY CASSETTE

The present invention relates to a receptacle for receiving a storage phosphor plate comprising a storage phosphor layer for storing X-ray information and an X-ray cassette provided with this type of receptacle.

In radiography, for diagnostic purposes an image of an object is produced by means of X-ray irradiation, said image being stored as a latent X-ray image in a storage phosphor layer. Therefore, this X-ray image contains image information on the object. The recording of X-ray images is used in particular in the field of medicine and in the field of the non-destructive testing (NDT) of objects, such as e.g. a welded seam. In order to read out the image information stored in the storage phosphor layer the storage phosphor layer is stimulated in a read-out apparatus by means of an irradiation device. This stimulation causes the storage phosphor layer to emit emission radiation which has an intensity corresponding to the quantity of image information of the X-ray image stored in the storage phosphor layer. The emission radiation emitted by the storage phosphor layer is collected by a detector and converted into electrical signals which contain an image of the image information. The electrical signals are further processed, and the image information stored in the storage phosphor layer is then made visible. For further analysis the image information can be displayed, for example, directly on a monitor or be written onto a photographic X-ray film by means of a printer that can be used especially for X-ray images.

The storage phosphor layer is applied to a support layer, and together they form a storage phosphor plate. For handling, the storage phosphor plate is generally located protected within an X-ray cassette which is introduced into the read-out apparatus for reading out the image information stored in the storage phosphor layer. The storage phosphor plate is removed from the X-ray cassette within the read-out apparatus. For this purpose the X-ray cassette has an opening through which the storage phosphor plate located within the X-ray cassette can be removed from the X-ray cassette and the storage phosphor plate located outside of the X-ray cassette can be inserted into the X-ray cassette.

X-ray cassettes and associated storage phosphor plates generally have dimensions which are matched to one another so as to guarantee problem-free introduction and removal of the storage phosphor plate as well as secure storage of the storage phosphor plate within the X-ray cassette. For particular applications, in particular in the field of non-destructive material testing and in dental applications, it may be necessary, however, to use storage phosphor plates the geometry and dimensions of which deviate from those generally used. This can be the case, for example, due to the particular geometry and the dimensions of the object of which an X-ray image is to be recorded.

JP 2002-182322 A discloses a holder for storage phosphor plates in which storage phosphor plates are held on additional, plate-type extensions which are applied to the support layer of the respective storage phosphor plate.

It is the object of the present invention to enable easy and secure holding of a storage phosphor plate within an X-ray cassette in a technically simple way.

This object is achieved with a receptacle for receiving a storage phosphor plate comprising a storage phosphor layer for storing X-ray information, the receptacle including a cover plate with a first recess and a base plate which is at a distance from the cover plate such that a receiving chamber for receiving the storage phosphor plate is provided between the base plate and the cover plate. The storage phosphor plate being held in the receiving chamber between the cover plate and the base plate, and the first recess of the cover plate being located above the surface of the storage phosphor layer of the received storage phosphor plate when the storage phosphor plate is received, a peripheral region of the recess of the cover plate lying on the surface of the storage phosphor layer. This object is also achieved according to an X-ray cassette including a receptacle as detailed previously.

The receptacle according to the invention comprises a cover plate with a first recess and a base plate which is at a distance from the cover plate such that a receiving chamber for receiving the storage phosphor plate is provided between the base plate and the cover plate. The storage phosphor plate is held here in the receiving chamber between the cover plate and the base plate, and the first recess of the cover plate is located above the surface of the storage phosphor layer of the received storage phosphor plate when the storage phosphor plate is received, a peripheral region of the recess of the cover plate lying on the surface of the storage phosphor layer. The X-ray cassette according to the invention has this type of receptacle according to the invention.

By virtue of the present invention it is possible to design the first recess and the receiving chamber such that storage phosphor plates of just about any size and geometry can be received by the receptacle. The first recess and the receiving chamber are advantageously matched here to the shape of the storage phosphor plate so that the storage phosphor plate can be held securely in the receptacle and be positioned accurately. Since the dimensions of the receptacle and the design of the X-ray cassette, in particular the interior of the latter, are advantageously matched to one another, the receptacle is also held securely and positioned within the X-ray cassette. The invention thus makes it possible to receive storage phosphor plates of just about any size and geometry of a conventional X-ray cassette, and to hold them securely within the latter. In this connection the receptacle constitutes a type of template which has a recess for the surface of the storage phosphor layer. The cover plate is in particular in the form of a frame. Since according to the invention the first recess is located above the surface of the storage phosphor layer of the storage phosphor plate being held such that only a peripheral region of the recess of the cover plate lies on the surface of the storage phosphor layer, the surface of the storage phosphor layer is advantageously held substantially free from the cover plate. In this way, when reading out the X-ray information stored in the storage phosphor layer in a read-out apparatus stimulation radiation can advantageously directly strike the storage phosphor layer, and the emission radiation emitted due to the stimulation of the storage phosphor layer can be emitted reliably and free from obstacles in the direction of a detector for collecting the emission radiation. The read-out of the X-ray information from the storage phosphor layer held in the receptacle is therefore not hindered by the receptacle. Since the peripheral region of the recess of the cover plate lies on the surface of the storage phosphor layer located on the support layer of the storage phosphor plate, and in this way the storage phosphor plate is held in the receiving chamber, additional measures, such as e.g. additional plate-type extensions of the support layer of the storage phosphor plate, can be omitted.

In one advantageous embodiment of the invention there is provided between the cover plate and the base plate a track-shaped void for receiving a peripheral region of the storage phosphor plate in which a peripheral region of the storage phosphor plate can be received such that a peripheral region of the recess of the cover plate lies on the surface of the storage phosphor layer. In this track-shaped void the storage phosphor plate can therefore be held in its peripheral region simply and securely in the receptacle. The track-shaped void is advantageously formed along opposing side lengths of the first recess. By means of the track-shaped void the storage phosphor plate can easily be introduced into and removed from the receptacle.

In a further advantageous embodiment there is provided in the cover plate a second recess which is adjacent to the first recess of the cover plate. This second recess advantageously serves to introduce the storage phosphor plate easily into and to remove the storage phosphor plate easily from the receiving chamber. The second recess can advantageously be in the form of a partial circle, in particular a semi-circle. The second recess is advantageously smaller than the first recess.

In one particularly preferred embodiment of the invention there is provided in the base plate a third recess which is located beneath the second recess of the cover plate. In this way a passage through the receptacle is formed, i.e. through the cover plate and the base plate. This passage enables particularly easy introduction and removal of the storage phosphor plate. The size and shape of the third recess are advantageously matched to the second recess. In particular, the second and the third recess can be of identical size and shape.

Particularly advantageously there is provided in the cover plate a fourth recess which is adjacent to the first recess of the cover plate and lies opposite the second recess. This fourth recess advantageously also serves to introduce the storage phosphor plate easily into and to remove the storage phosphor plate easily from the receiving chamber. The fourth recess can advantageously be in the form of a partial circle, in particular a semi-circle. The fourth recess is advantageously smaller than the first recess. Furthermore, the fourth recess is advantageously of the same shape and size as the second recess. The fourth recess lies opposite the second recess such that the first recess is located between the second and the fourth recess.

Preferably there is provided in the base plate a fifth recess which is located beneath the fourth recess of the cover plate. In this way a further passage is formed through the receptacle, i.e. through the cover plate and the base plate. This further passage lies opposite the passage formed through the second and third recess, and enables even easier introduction into and removal from the storage phosphor plate. The size and shape of the fifth recess are advantageously matched to the fourth recess. In particular, the fourth and the fifth recess can be of the same size and shape.

Particularly preferably there is provided in the base plate a sixth recess for introducing the storage phosphor plate into and for removing the storage phosphor plate from the receiving chamber. Through the sixth recess the storage phosphor plate can be easily and conveniently introduced into and be removed from the receiving chamber. The sixth recess advantageously opens out into the receiving chamber, and preferably has a width which substantially corresponds to the width of the receiving chamber. In particular, it is directly adjacent to the receiving chamber. Preferably the sixth recess has an elongated shape which runs non-parallel, in particular perpendicularly, to the track-shaped void.

In one advantageous embodiment of the invention the sixth recess is adjacent to the fifth recess. By means of this embodiment the storage phosphor plate can be introduced particularly easily and conveniently into the receiving chamber and be removed from the receiving chamber. The fifth and the sixth recess advantageously pass across one another.

Preferably the receptacle is produced from a flexible material, in particular a flexible plastic material. This is advantageous for the handling of the receptacle, for example in a read-out apparatus for reading out the X-ray information stored in the storage phosphor layer. Advantageously the receptacle is therefore flexible, for example for its handling.

In a further advantageous embodiment the receptacle is designed to receive a number of storage phosphor plates, a number of receiving chambers being provided between the base plate and the cover plate for receiving the storage phosphor plates. The cover plate has a number of first recesses which are located over the surfaces of the storage phosphor layers of the received storage phosphor plates. By means of this embodiment of the receptacle a number of storage phosphor plates, which can have different formats, can advantageously be received and optionally processed simultaneously. This advantageously guarantees a short processing time of the number of storage phosphor plates.

In one particularly preferred embodiment of the invention the X-ray cassette has two closeable openings through which the receptacle can be introduced into the X-ray cassette and the receptacle located within the X-ray cassette can be removed from the X-ray cassette. This makes it particularly easy to handle the X-ray cassette and/or the receptacle. It is possible, for example, for an operator to remove the receptacle from the X-ray cassette through one of the openings or to introduce it into the X-ray cassette, whereas the X-ray cassette with the other opening sits in a read-out apparatus for reading out the X-ray information stored in the storage phosphor layer. In this way good user friendliness is guaranteed.

Particularly advantageously, one of the openings is formed on a front surface of the X-ray cassette, and the other of the openings is formed on a cover surface of the X-ray cassette. Advantageously, the opening on the front side is particularly suitable for a mechanical removal device, for example of a read-out apparatus for reading out the X-ray information stored in the storage phosphor layer of the storage phosphor plate. The opening on the cover surface is then advantageously suitable for an operator for introducing and removing the storage phosphor plate. In this way the operator gains convenient and easy access to the interior of the X-ray cassette.

Figure 2:
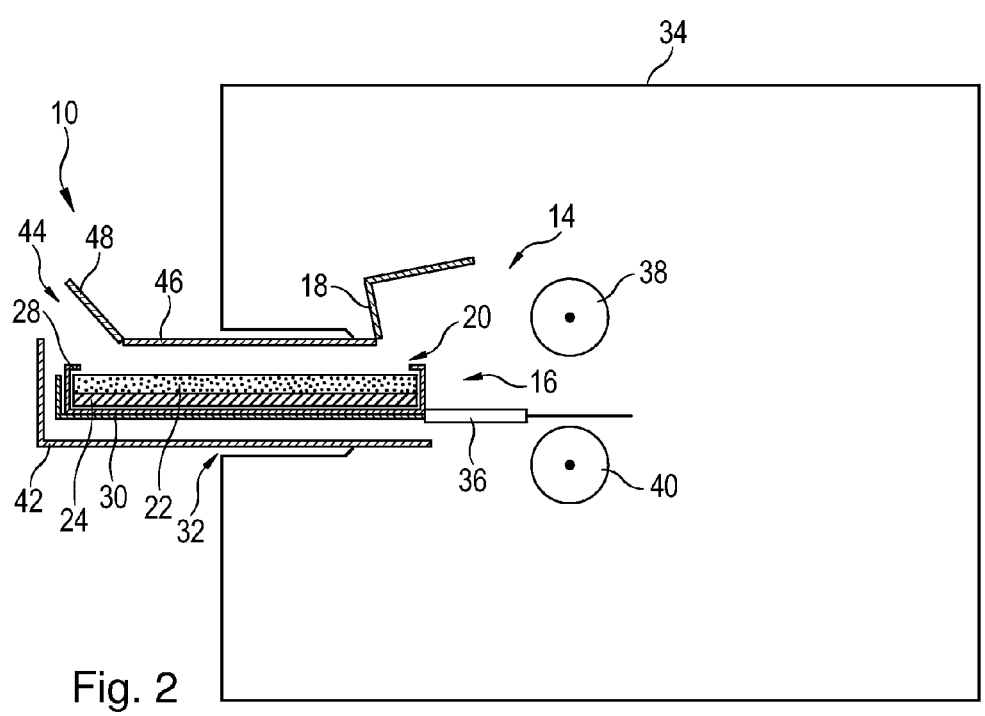
Figure 3:
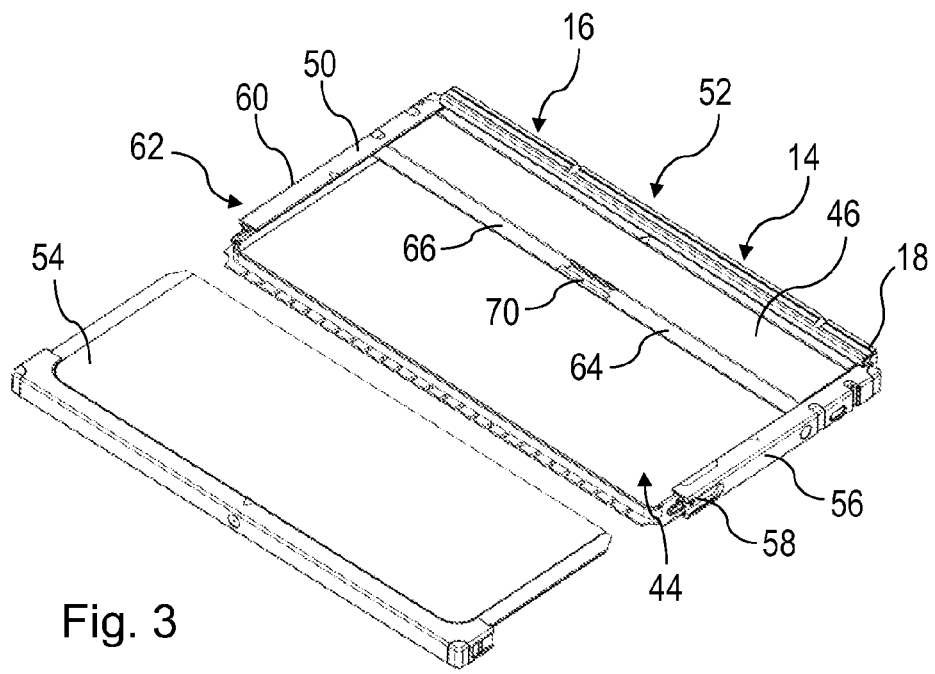
Figure 4:
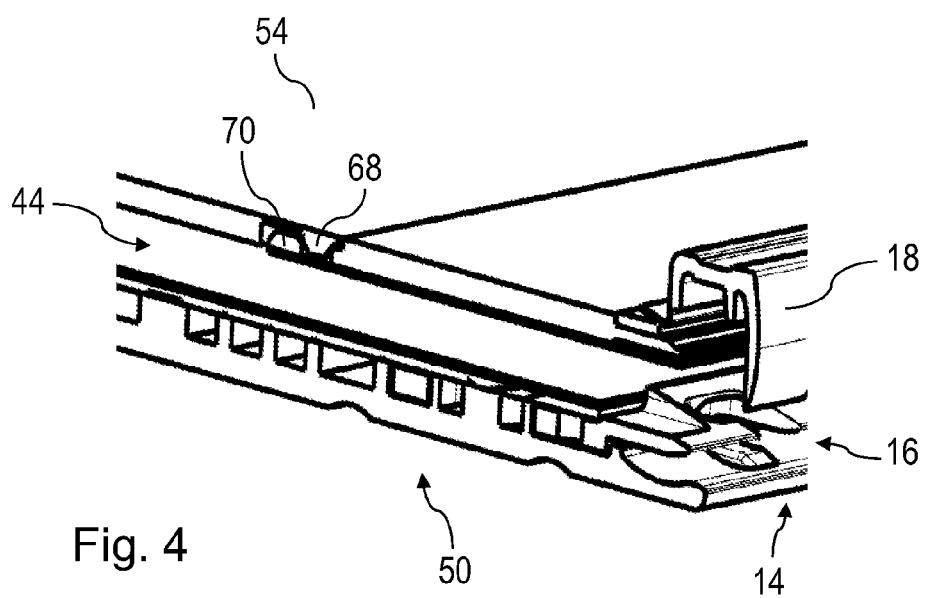
Figure 5A:
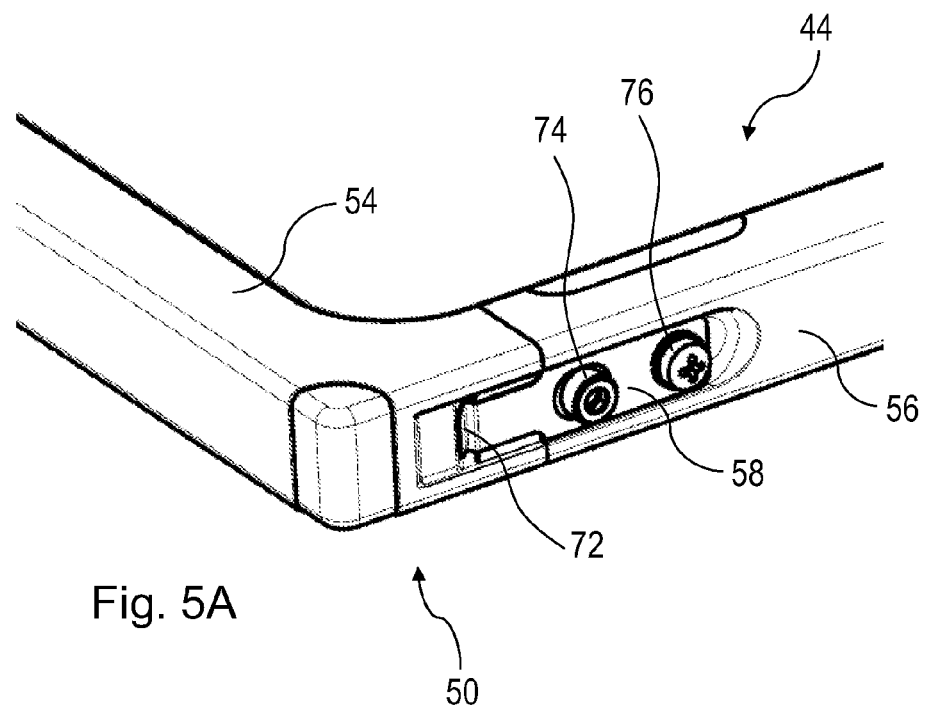
Figure 6A:
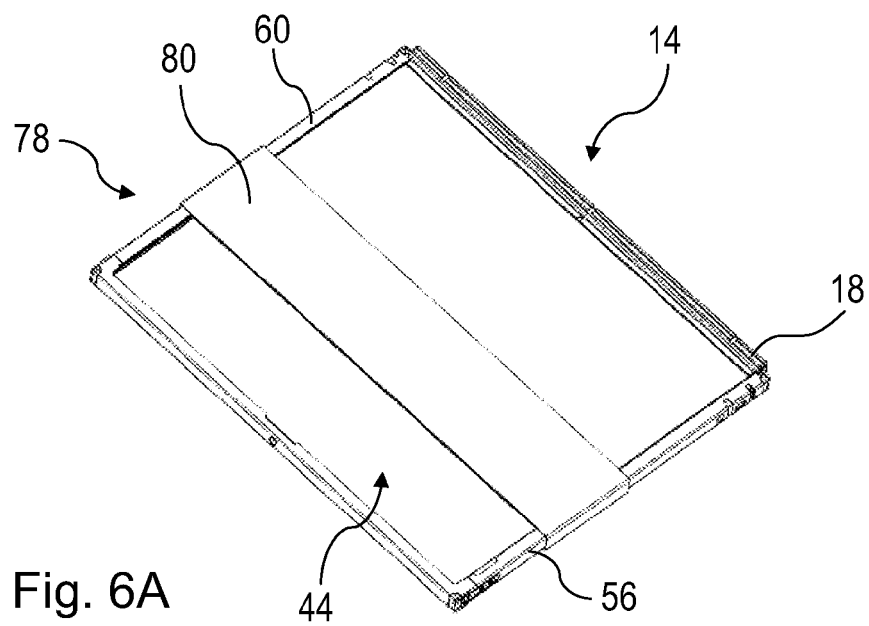
Figure 7A:
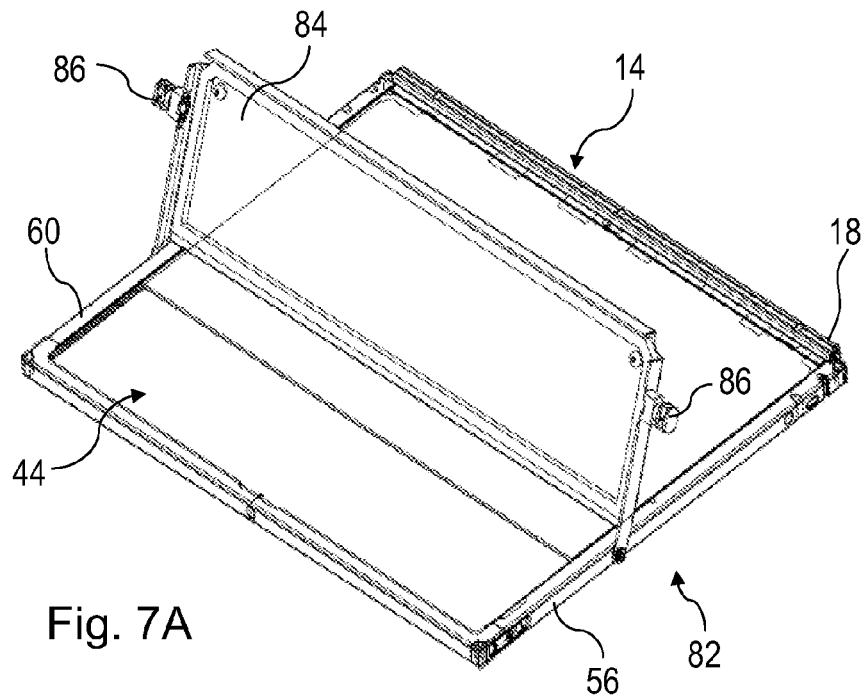
Figure 8:
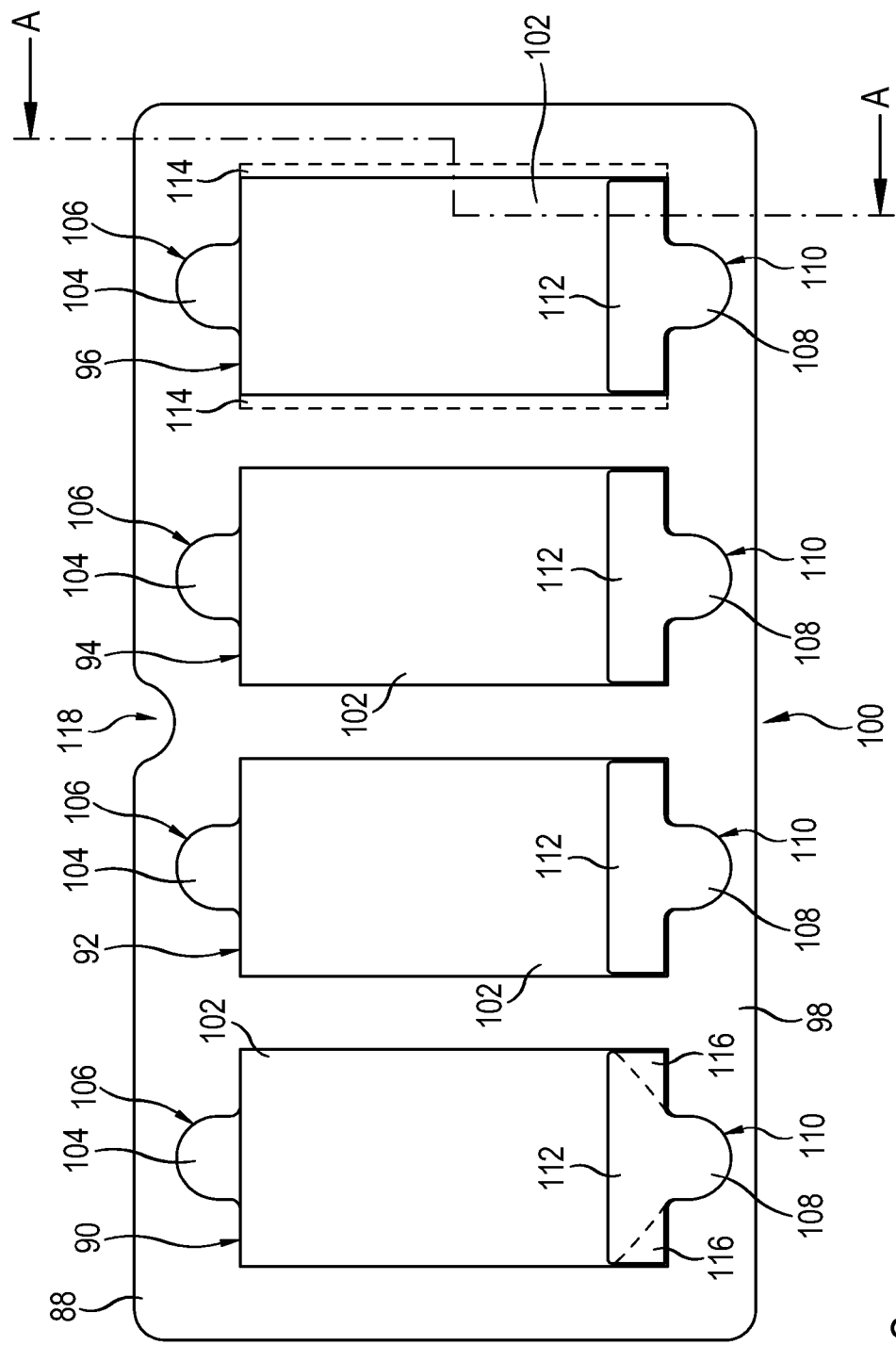
Figure 9:
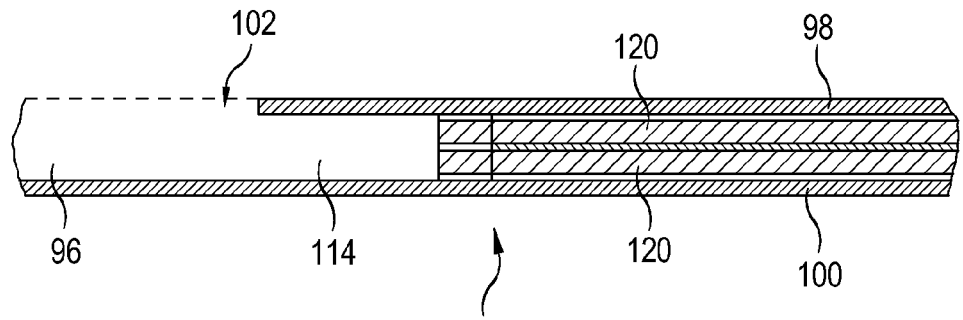
Figure 10A:
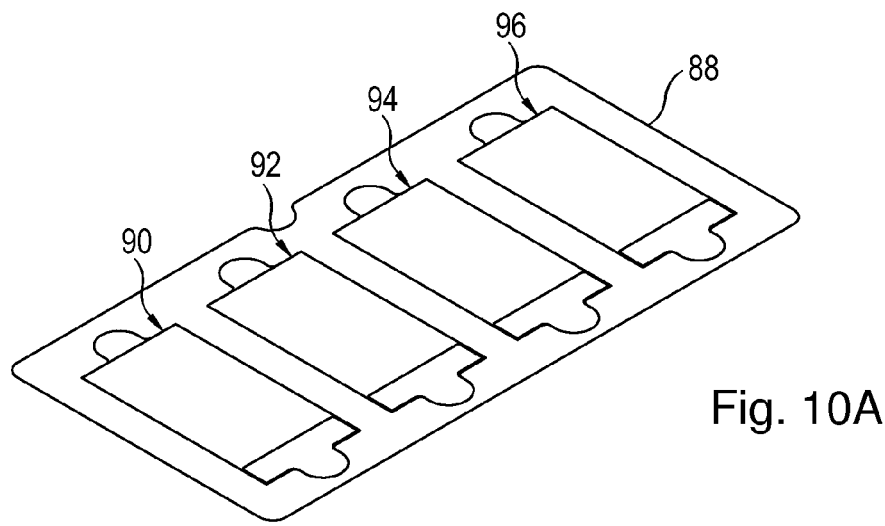
Figure 13:
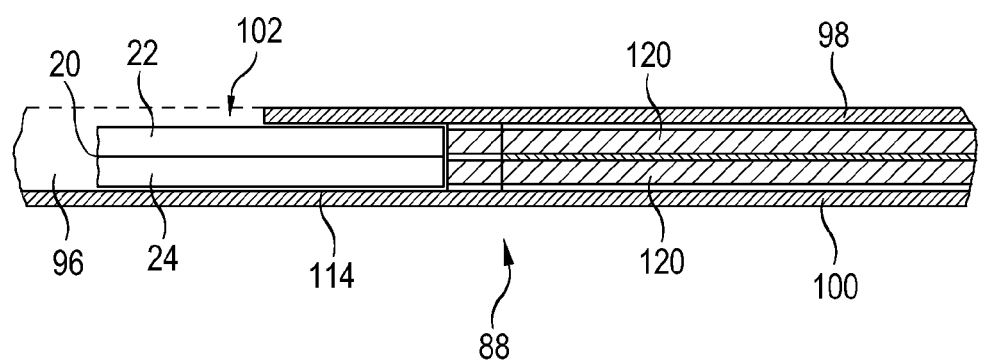

Further advantages of the invention are given by the following description of exemplary embodiments, reference being made to the attached drawings. These show as follows:

FIG. 1 a diagrammatic illustration of an exemplary embodiment of a system comprising an X-ray cassette, which has an opening, and a read-out apparatus for reading out a storage phosphor plate, FIG. 2 a diagrammatic illustration of an exemplary embodiment of a system comprising an X-ray cassette, which has two openings, and the read-out apparatus for reading out a storage phosphor plate, FIG. 3 a diagrammatic illustration of an exemplary embodiment of an X-ray cassette having a detachable cover part as a closure for one if its openings, FIG. 4 a diagrammatic illustration of a section through the X-ray cassette according to FIG. 3, FIGS. 5A, B diagrammatic illustrations of a closure spring for closing the detachable cover part of the X-ray cassette according to FIG. 3, FIGS. 6A, B diagrammatic illustrations of an exemplary embodiment of an X-ray cassette having a moveable cover part as a closure for one of its openings, FIGS. 7A, B diagrammatic illustrations of an exemplary embodiment of an X-ray cassette having a pivotable cover part as a closure for one of its openings, FIG. 8 a diagrammatic illustration of a top view of an exemplary embodiment of a receptacle having a number of receiving chambers for symmetrical storage phosphor plates, FIG. 9 a diagrammatic illustration of a cross-section of the receiving apparatus according to FIG. 8, FIGS. 10A, B diagrammatic illustrations of perspective views of the receiving apparatus according to FIG. 8 with or without received storage phosphor plates, and FIG. 11 a further diagrammatic illustration of the X-ray cassette according to FIG. 3 having a receptacle located in its interior according to FIG. 8, FIG. 12 a diagrammatic illustration of a top view of an exemplary embodiment of a receptacle having a single receiving chamber for an asymmetrical storage phosphor plate, FIG. 13 a further diagrammatic illustration of a cross-section of the receptacle according to FIG. 8.

In the following, unless specified to the contrary, the same reference numbers are used for the same elements or elements with the same effect.

FIG. 1 shows a system 10 with an X-ray cassette 12 which has an opening 14. The opening 14 is formed here on a narrow front surface 16 of the X-ray cassette 12. In order to open and close the opening 14 the X-ray cassette 12 has a pivotable closure 18. Within the X-ray cassette 12 there is a storage phosphor plate 20 which can be conveyed through the opening 14 out of the X-ray cassette 12 and from outside of the X-ray cassette 12 into the latter. The X-ray cassette 12 contains a storage phosphor layer 22 for storing X-ray information and a support layer 24 to which the storage phosphor layer 22 is applied. The storage phosphor plate 20 is disposed in a receiving chamber 26 of a receptacle 28 in which the storage phosphor plate 20 is held securely. The storage phosphor plate 20 lies on a withdrawable drawer 30 within the X-ray cassette 12.

The X-ray cassette 12 sits in a feed device 32 of a read-out apparatus 34 for reading out the storage phosphor plate 20 located within the X-ray cassette 12. The read-out apparatus 34 contains a device for opening and closing the closure 18 of the X-ray cassette 12. The read-out apparatus 34 further contains a removal device 36 which, with the closure 18 open, engages on the edge of the drawer 30 and pulls the latter together with the storage phosphor plate 20 lying on top of it out of the X-ray cassette 12 in the direction of two feed rollers 38 and 40 disposed one over the other. The feed rollers 38, 40 grasp the storage phosphor plate 20 located in the receptacle 28 and convey it further into the interior of the read-out apparatus 34 for further processing. After the read-out of X-ray information stored in the storage phosphor layer 22 the storage phosphor plate 20 is conveyed back into the X-ray cassette 12. During processing within the read-out apparatus 34 the storage phosphor plate 20 remains in the receptacle 28. The read-out apparatus 34 is known in principle, and so is not described in any further detail. With regard to this, reference is made in particular to the general prior art described above.

FIG. 2 shows the system 10 with an X-ray cassette 42 which has two openings. In addition to the opening 14 on its front surface 16 the X-ray cassette 42 has an opening 44 on its cover surface 46. Located within the X-ray cassette 42 is the storage phosphor plate 20. The latter can be conveyed through the opening 44 out of the X-ray cassette 12 and from outside of the X-ray cassette 12 into the latter. The opening 44 can be opened and closed by a closure 48 which can be pivoted here. The X-ray cassette 42 sits with its opening 14 in the feed device 32 of the read-out apparatus 34. In this position the opening 44 projects out of the feed device 32, and is in particular accessible to an operator. Advantageously, the operator can operate the closure 48 and move the storage phosphor plate 20 into the X-ray cassette 42 or out of it as required while it sits in the feed device 32. In the present exemplary embodiment according to FIG. 2 the storage phosphor plate 20 is located in the receptacle 28. It order to utilise the advantages of the X-ray cassette 42 with its two openings 14 and 44 the storage phosphor plate 20 does not, however, necessarily require the receptacle 28. In fact, in so far as it has a size and shape suitable for the interior of the X-ray cassette 42, the storage phosphor plate 20 can also be stored in the X-ray cassette 42 without a receptacle 28.

FIG. 3 shows an X-ray cassette 50 with two openings 14 and 44 for introducing a storage phosphor plate into the X-ray cassette 50 and for removing the storage phosphor plate located within the X-ray cassette 50 from the X-ray cassette 50. The opening 14 is formed on the narrow front surface 16 of the X-ray cassette 50 and can be opened and closed by means of the closure 18. Here the closure 18 is substantially L-shaped or in the form of a hook and pivotably attached to the front surface 16 at a joint along a cross-over of the cover surface 46 of the X-ray cassette 50. The opening 44 is formed in the cover surface 46. In the present exemplary embodiment the opening 44 is a distance away from the cross-over of the cover surface 46 towards the front surface 16 and extends to a left- and right-hand peripheral region substantially over the whole width of the X-ray cassette 50. Here the opening 44 further comprises a narrow front surface 52 which lies opposite the front surface 16. The opening 44 can be opened and closed by means of a detachable cover part 54 as a closure 48.

A closure spring 58 is attached to a narrow side surface 56 of the X-ray cassette 50 as a closure mechanism for opening and closing the opening 44. Advantageously a further closure spring 62 is provided on a side surface 60 of the X-ray cassette 50 lying opposite the side surface 56. In this way the functionality of the opening and closing is improved. On one closure edge 64 where the X-ray cassette 50 and its cover part 54 meet one another in the closed state of the opening 44 a screen is applied to the X-ray cassette 50 in order to guarantee the impermeability to light of the X-ray cassette 50 in its closed state. Here the screen is in the form of a narrow overlap 66 so that when the opening 44 is closed this overlap 66 extends in the region of the closure edge 64 below the cover part 54. In principle it is also possible to design the screen differently. For example, the overlap 66 can be applied such that it extends over the cover part 54 when the opening 44 is closed.

For secure and reliable closing of the opening 44 by the cover part 54, in one region of the closure edge 64 where the X-ray cassette 50 and its cover part 54 meet one another in the closed state of the opening 44, opposing detents are provided in the X-ray cassette 50 and the cover part 54. These opposing detents engage with one another in the closed state of the opening 44. The detents can substantially extend over the whole width of the closure edge 64. However, it is also possible to limit the spread of the detents to one part of the closure edge 64. For the sake of simplicity the detents extend here over a partial region of the closure edge 64 which lies approximately in the centre of the width extension of the closure edge 64. The detent provided in the X-ray cassette 50 is advantageously formed in the overlap 66.

FIG. 4 illustrates this closure mechanism by means of the opposing detents. FIG. 4 shows a portion of a cross-section of the X-ray cassette 50 according to FIG. 3 when the opening is closed 44. A downwardly directed detent 68 in the cover part 54 and an upwardly directed detent 70 in the X-ray cassette 50 are shown. The two detents 68, 70 engage with one another in the illustrated closed state of the opening 44. FIG. 4 also illustrates the L-shaped closure 18 for closing the opening 14 on the front surface 16. In the illustration according to FIG. 4 the closure 18 is pivoted upwardly in its open state. Therefore the opening 14 is open.

Figure 5B:
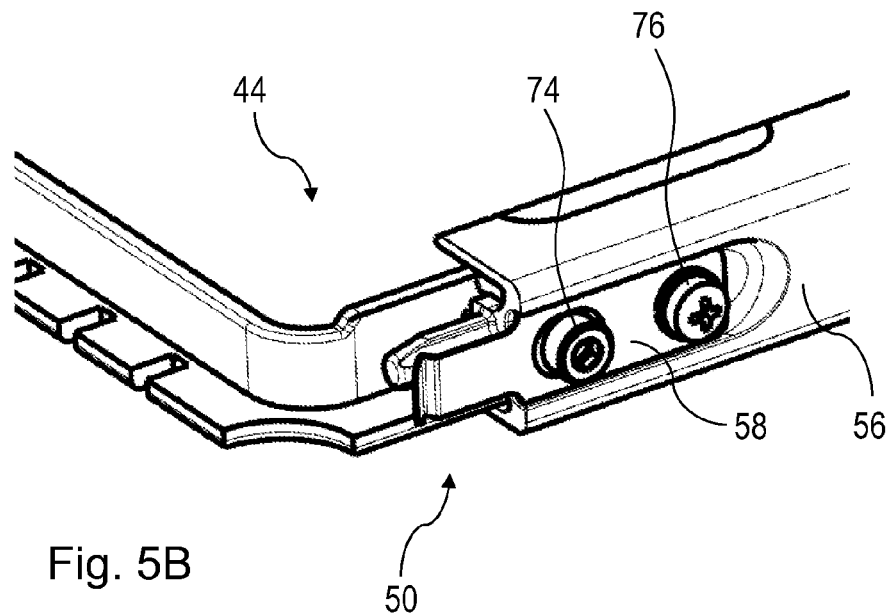

FIG. 5A and FIG. 5B illustrate the closure spring 58 for closing the detachable cover part 54 of the X-ray cassette 50 according to FIG. 3. The closure spring 58 is attached to the side surface 56 of the X-ray cassette 50. In the illustration according to FIG. 5A the cover part 54 is fastened to the X-ray cassette 50 so that the opening 44 is closed. The closure spring 58 engages with the cover part 54. For this purpose the closure spring 58 has a detent 72 on its tip. This detent 72 engages with the cover part 54 and locks the latter to the X-ray cassette 50. The closure spring 58 is fastened to the X-ray cassette 50 by means of two screws 74 and 76. If the closure spring 58 is pressed inwardly in the direction of the interior of the X-ray cassette 50, the detent 72 is released from the cover part 54. The latter can then be removed from the X-ray cassette 50. The illustration according to FIG. 5B illustrates the configuration of the closure spring 58. FIG. 5B shows a section of the X-ray cassette 50 with the opening 44 open. The cover part 54 is not fastened to the X-ray cassette 50. FIG. 5B clearly shows the detent 72 of the closure spring 58. The closure spring 58 can advantageously be of a suitable length so as to thus optimally set the force required to release the cover part 54. This force should not be too great so that simple opening is made possible for the operator. The closure spring 62 optionally attached to the side surface 60 advantageously corresponds to the closure spring 58.

Figure 6B:
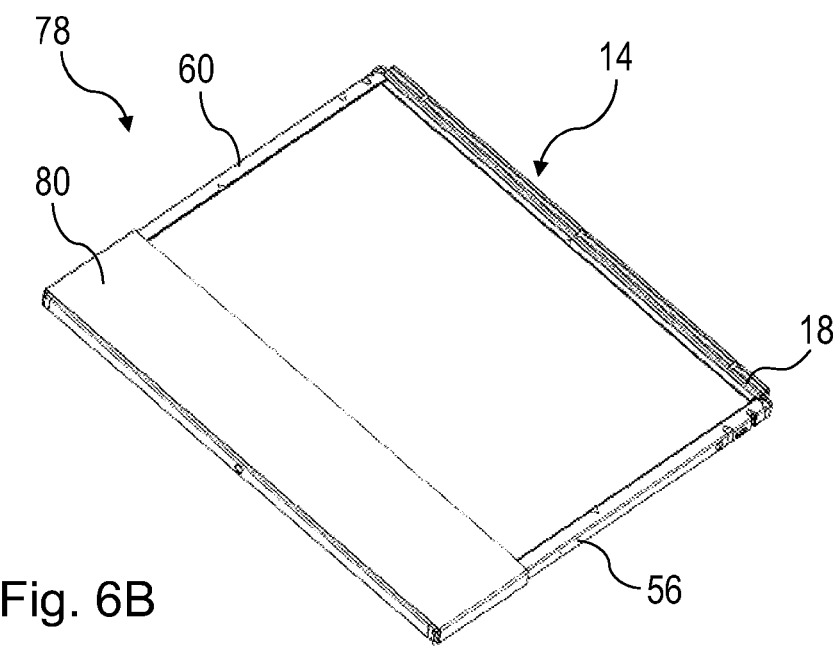

FIG. 6A and FIG. 6B show an X-ray cassette 78 with a moveable cover part 80 as a closure 48 for its opening 44. The cover part 80 extends here over the whole width of the X-ray cassette 78. The cover part 80 is moveably mounted on the side surfaces 56 and 60, and can be moved perpendicularly to the width extension of the X-ray cassette 78 along its cover surface. FIG. 6A shows the X-ray cassette 78 with the opening 44 open, and FIG. 6B with the opening 44 closed.

Figure 7B:
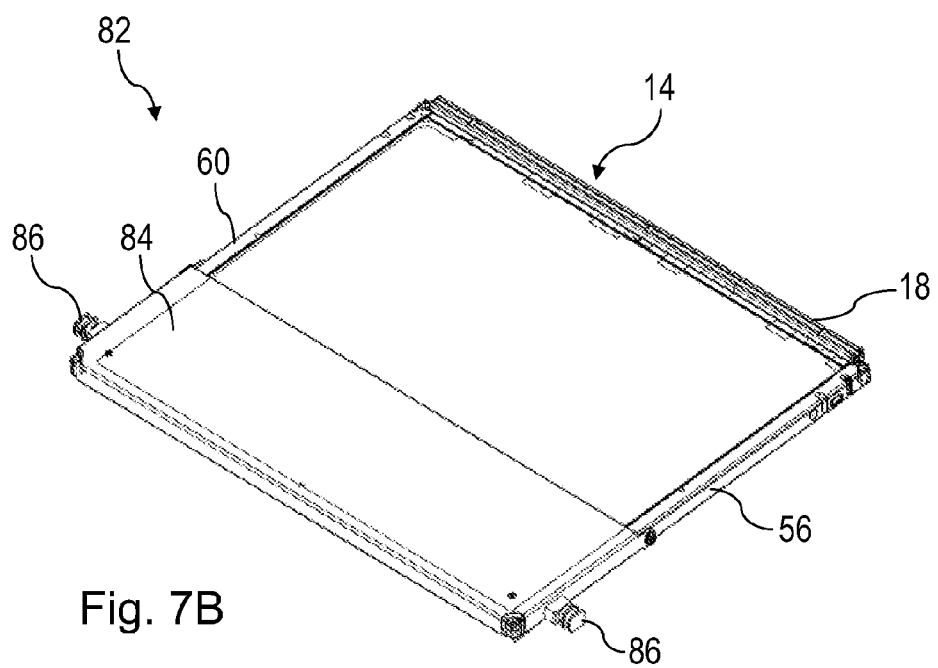

FIG. 7A and FIG. 7B show an X-ray cassette 82 with a pivotable cover part 84 as a closure 48 for its opening 44. The cover part 84 is pivotably mounted on both opposing side surfaces 56, 60 of the X-ray cassette 82. FIG. 7A shows the X-ray cassette 82 with the opening 44 open, and FIG. 7B with the opening 44 closed. There are advantageously disposed on the cover part 84 two snap closures 86 which in the closed state of the cover part 84 engage in corresponding holes which are provided in the side surfaces 56, 60.

FIG. 8 shows a top view of a receptacle 88 for receiving a number of storage phosphor plates. In the present exemplary embodiment the receptacle 88 can receive, for example, four storage phosphor plates. For this purpose it has a number of, i.e. in this case four, receiving chambers 90, 92, 94 and 96 the dimensions and geometries of which are matched to the storage phosphor plates to be received by the latter. Here the receiving chambers 90, 92, 94, 96 respectively have a rectangular geometry for correspondingly rectangularly designed, symmetrical storage phosphor plates. The receptacle 88 has a cover plate 98 and a base plate 100 located beneath the latter. The cover plate 98 and the base plate 100 are a distance away from one another and are connected to one another outside of the receiving chambers 90, 92, 94, 96 by means of an intermediate layer disposed between them. For each of the receiving chambers 90, 92, 94, 96 the cover plate 98 has a first recess 102 so that the cover plate 98 has four first recesses here 102. The first recesses 102 guarantee that with storage phosphor plates received by the receiving chambers 90, 92, 94, 96 the storage phosphor layers of the latter are substantially not covered and are freely accessible. Advantageously the first recesses 102 have substantially the sizes of the storage phosphor layers, and are located over the surfaces of the storage phosphor layers of the received storage phosphor plates when the storage phosphor plates are received.

There are provided in the cover plate 98 second recesses 104 assigned to the receiving chambers 90, 92, 94 and 96 which are adjacent here to the head sides of the first recesses 102. Furthermore, there are provided in the base plate 100 third recesses 106 assigned to the receiving chambers 90, 92, 94, 96 which are located beneath the second recesses 104. Together with recesses provided in the intermediate layer complete passages through the receptacle 88 are therefore formed on the head sides of the first recesses 102. Furthermore, there are provided in the cover plate 98 fourth recesses 108 assigned to the receiving chambers 90, 92, 94 and 96 which are adjacent here to the foot sides of the first recesses 102. Moreover, there are provided in the base plate 100 fifth recesses 110 assigned to the receiving chambers 90, 92, 94 and 96 which are located beneath the fourth recesses 108. Together with further recesses provided in the intermediate layer complete passages through the receptacle 88 are therefore also formed on the foot sides of the first recesses 102. The complete passages through the receptacle 88 on the head sides and the foot sides of the first recesses advantageously enable simple, secure and convenient introduction of the storage phosphor plates into the receiving chambers 90, 92, 94, 96 as well as simple, secure and convenient removal of the storage phosphor plates from the receiving chambers 90, 92, 94, 96. The passages and the recesses forming the latter advantageously have a partial circle here which enables particularly easy grasping of the storage phosphor plate, in particular by the operator.

There are provided in the base plate 100 sixth recesses 112 assigned to the receiving chambers 90, 92, 94 and 96 which serve for easy and reliable introduction of the storage phosphor plates into and removal of the storage phosphor plates from the receiving chambers 90, 92, 94, 96. The sixth recesses 112 are directly adjacent to the fifth recesses 110 here and are located beneath the first recesses 102. In this way a complete passage through the receptacle 88 is also formed with the sixth recesses 112. The sixth recesses 112 extend substantially over the whole width of the receiving chambers 90, 92, 94, 96 and are rectangular here. However, they can also be of any other suitable shape.

The cover plate 98 and the base plate 100 are connected to one another by means of the intermediate layer such that there are provided along the opposing long sides of the receiving chambers 90, 92, 94, 96, between the cover plate 98 and the base plate 100, track-shaped voids 114 for respectively receiving a peripheral region of the storage phosphor plates. The track-shaped voids 114 of the receiving chamber 96 are illustrated representatively in FIG. 8. The storage phosphor plates can be moved easily within these track-shaped voids 114 for introducing and removing. At the same time the storage phosphor plates located within the receiving chambers 90, 92, 94, 96 are held securely. This is particularly advantageous for the further processing of the storage phosphor plates held in the receptacle 88 in a read-out apparatus, such as that of the read-out apparatus 34 (FIG. 2). In particular for this further processing of the storage phosphor plates the receptacle 88 is made of a flexible material, in particular a flexible plastic material. This advantageously enables slight bending of the receptacle 88. In order to achieve even better holding of the storage phosphor plates in the receiving chambers 90, 92, 94, 96, small overlaps 116 can be formed in the cover plate 98 in peripheral regions of the first recesses 102, in particular in the region of their foot sides. Overlaps 116 are especially advantageous over the sixth recesses 112. In FIG.

8 these overlaps 116 are indicated as an example by the receiving chamber 90. Overlaps 116 can also be provided with the other receiving chambers 92, 94, 96. For reliable and easy grasping of the receptacle 88, in particular by the operator, the receptacle 88 has a notch 118 on one long side.

FIGS. 9 and 13 show as an example a cross-sectional view of the receptacle 88 according to FIG. 8 along section A-A with or without a received storage phosphor plate 20. The cover plate 98 which is connected to the base plate 100 by means of an intermediate layer 120 is illustrated. The first recess 102 is located over the receiving chamber 96 in the cover plate 98. In the peripheral region of the first recess 102 of the cover plate 98 there is a void 114 (see in particular FIG. 9) which is covered by the cover plate 98. The storage phosphor plate 20 is received in this void 114 (see FIG. 13) in such a way that the peripheral region of the first recess 102 of the cover plate 98 lies on the surface of the storage phosphor layer 22 located on the support layer 24 and preferably exerts a slight pressure on the latter so that the storage phosphor plate 20 is held in the void 114 by friction fit as well as by the form fit provided by the shape of the receiving chamber 96. Additional measures for holding the storage phosphor plate 20, such as e.g. additional plate-like extensions on the support layer 24 of the latter, can be omitted due to this. Thus, secure receiving of the storage phosphor plate 20 in the receiving chamber 96 is easily guaranteed.

In the example illustrated the void 114 is formed on the long side of the receiving chamber 96 as a track-shaped void 114 in which the peripheral region of the storage phosphor plate 20 is received, the peripheral region of the recess 102 of the cover plate 98 coming to lie on the surface of the storage phosphor layer 22.

Figure 10B:
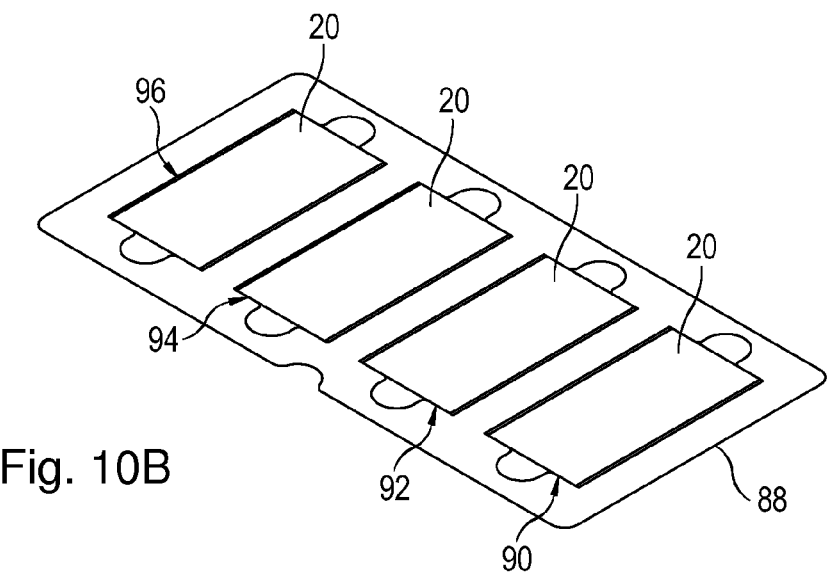

FIG. 10A and FIG. 10B show perspective views of the upper side of the receptacle 88 according to FIG. 8. FIG. 10A shows the receptacle 88 without received storage phosphor plates. FIG. 10B shows the receptacle 88 with received storage phosphor plates 20.

FIG. 11 shows a further diagrammatic illustration of the X-ray cassette 50 according to FIG. 3 with a receptacle 88 according to FIG. 8 located in its interior. In the illustration according to FIG. 11 the cover part 54 is removed from the X-ray cassette 50 so that the opening 44 is open. In this illustration storage phosphor plates 20 are located in the receiving chambers 90, 92, 94, 96 of the receptacle 88. With the cover part open 54 the receptacle 88 can be removed easily from the X-ray cassette 50, particularly by an operator. For this purpose the illustrated notch 118 of the receptacle 88 is particularly practical.

FIG. 12 shows a top view of a receptacle 122 with a receiving chamber 124 for a storage phosphor plate. The receiving chamber 124 has an asymmetrical shape here in order to make it clear that in principle storage phosphor plates of any shape can be received by a correspondingly designed receptacle. The principle for arranging and designing the different recesses 102, 104, 106, 108, 110 and 112 of the cover plate 98 and the base plate 100 corresponds largely to that of the receptacle 88. It will therefore not be discussed in any greater detail here, and in this regard reference is made to the above description of the latter.

The invention claimed is:

1. A receptacle for receiving a storage phosphor plate comprising a storage phosphor layer for storing X-ray information, the receptacle including:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer and exerting pressure on the surface of the storage phosphor layer to hold the storage phosphor plate in the receiving chamber by frictional connection.

2. The receptacle according to claim 1, wherein provided between the cover plate and the base plate is a track-shaped void in which a peripheral region of the storage phosphor plate is received such that a peripheral region of the first recess of the cover plate lies on the surface of the storage phosphor layer.

3. A receptacle for receiving a storage phosphor plate comprising a storage phosphor layer for storing X-ray information, the receptacle including:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer,
wherein provided in the cover plate is a second recess which is adjacent to the first recess of the cover plate.

4. The receptacle according to claim 3, wherein provided in the base plate is a third recess which is located beneath the second recess of the cover plate.

5. The receptacle according to claim 4, wherein provided in the cover plate is a fourth recess which is adjacent to the first recess of the cover plate and lies opposite the second recess.

6. The receptacle according to claim 5, wherein provided in the base plate is a fifth recess which is located beneath the fourth recess of the cover plate.

7. The receptacle according to claim 6 wherein provided in the base plate is a sixth recess through which the storage phosphor plate is introduced into the receiving chamber and removed from the receiving chamber.

8. The receptacle according to claim 7, wherein the sixth recess is adjacent to the fifth recess.

9. The receptacle according to claim 1, said receptacle being produced from a flexible plastic material.

10. A receptacle for receiving a storage phosphor plate comprising a storage phosphor layer for storing X-ray information, the receptacle including:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer, wherein the receptacle is designed to receive a number of storage phosphor plates, a number of receiving chambers being provided between the base plate and the cover plate for receiving the storage phosphor plates and the cover plate having a number of first recesses which are located over the surfaces of the storage phosphor layers of the received storage phosphor plates.

11. An X-ray cassette including a receptacle, comprising:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer and exerting pressure on the surface of the storage phosphor layer to hold the storage phosphor plate in the receiving chamber by frictional connection.

12. The X-ray cassette according to claim 11 having two closeable openings through which the receptacle is introduced into the X-ray cassette and the receptacle located within the X-ray cassette is removed from the X-ray cassette.

13. An X-ray cassette including a receptacle, comprising:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer,
wherein the X-ray cassette has two closeable openings through which the receptacle is introduced into the X-ray cassette and the receptacle located within the X-ray cassette is removed from the X-ray cassette, one of the openings is formed on a front surface of the X-ray cassette, and the other of the openings is formed on a cover surface of the X-ray cassette.

14. The receptacle according to claim 7, the sixth recess having a width which substantially corresponds to the width of the receiving chamber.

15. A receptacle for receiving a storage phosphor plate comprising a storage phosphor layer for storing X-ray information, the receptacle including:
a cover plate with a first recess and
a base plate which is at a distance from the cover plate such that a receiving chamber for receiving the storage phosphor plate is provided between the base plate and the cover plate,
the storage phosphor plate being held in the receiving chamber between the cover plate and the base plate, and the first recess of the cover plate being located above the surface of the storage phosphor layer of the received storage phosphor plate when the storage phosphor plate is received, a peripheral region of the first recess of the cover plate lying on the surface of the storage phosphor layer,
wherein provided between the cover plate and the base plate is a track-shaped void in which a peripheral region of the storage phosphor plate is received such that a peripheral region of the first recess of the cover plate lies on the surface of the storage phosphor layer, the first recess having an elongated shape which runs non-parallel to the track-shaped void.

16. A method for receiving a storage phosphor plate in a receptacle including a storage phosphor layer for storing X-ray information, the method comprising:
providing a cover plate with a first recess;
providing a base plate;
maintaining a distance between the cover plate and the base plate to create a receiving chamber for receiving the storage phosphor plate between the base plate and the cover plate;
holding the storage phosphor plate in the receiving chamber between the cover plate and the base plate, the first recess of the cover plate being located above the surface of the storage phosphor layer of the received storage phosphor plate when the storage phosphor plate is received, and a peripheral region of the first recess of the cover plate lying on the surface of the storage phosphor layer and exerting pressure on the surface of the storage phosphor layer to hold the storage phosphor plate in the receiving chamber by frictional connection.

* * * * *